United States Patent [19]

Nagashima

[11] Patent Number: 5,062,875

[45] Date of Patent: Nov. 5, 1991

[54] AIR CLEANER

[75] Inventor: Akira Nagashima, Kawasaki, Japan

[73] Assignee: Kioritz Corporation, Tokyo, Japan

[21] Appl. No.: 611,586

[22] Filed: Nov. 13, 1990

[30] Foreign Application Priority Data

Dec. 4, 1989 [JP] Japan ............................ 1-140400[U]

[51] Int. Cl.[5] ............................................ B01D 46/10

[52] U.S. Cl. ........................................ 55/493; 55/498; 55/503; 55/508; 55/510

[58] Field of Search ...................... 55/385.3, 493, 498, 55/503, 508, 510; 30/381

[56] References Cited

U.S. PATENT DOCUMENTS

| | | | |
|---|---|---|---|
| 1,947,797 | 2/1934 | Radford | 55/493 X |
| 3,473,301 | 10/1969 | Buckman | 55/510 |
| 3,488,928 | 1/1970 | Tarala | 55/498 X |
| 4,594,083 | 6/1986 | Hiraizumi | 55/385.3 |
| 4,783,207 | 11/1988 | Nagashima et al. | 55/498 |
| 4,819,589 | 4/1989 | Nagashima . | |

*Primary Examiner*—Charles Hart

*Attorney, Agent, or Firm*—Browdy and Neimark

[57] ABSTRACT

Disclosed is an air cleaner including a base body, which is equipped with an outlet passage. A cylindrical filter element is placed on this base body. A cover member is engaged with the upper edge of the filter element so as to enclose the inner space of the filter element. The cover member is equipped with a bolt, which protrudes from the central lower surface portion of the cover member. Further, diametral protrusions are formed on the outer surrface of the cover member.

2 Claims, 1 Drawing Sheet

AIR CLEANER

BACKGROUND OF THE INVENTION

In a portable-type operating machine, such as a chain saw, which has an internal combustion engine as its driving means, an air cleaner, which cleans the air sucked into the machine from outside before it is conveyed to the carburetor, is generally arranged in the machine at a position that is in the vicinity of the carburetor. The trouble with this type of conventional air cleaner is that its overall construction is relatively complicated, with the number of parts being rather large. In addition, the operation of mounting it on the machine body and its maintenance have been rather bothersome. Furthermore, the machine is subject to dust contamination while the air cleaner is detached from the machine.

SUMMARY OF THE INVENTION

It is accordingly an object of this invention to eliminate the above problems in the prior art and provide an air cleaner which has a simple and convenient form.

In accordance with this invention, there is provided an air cleaner comprising: a base body which includes a boss section and an outlet passage, a cylindrical filter element having an upper end section and a lower end section which is situated on the above-mentioned base body, a cover member which includes a bolt protruding from the center of its lower surface and which is adapted to be engaged with a tapped hole formed in the boss section of the above-mentioned base body and which is adapted to be engaged with the upper end section of the above-mentioned filter element so as to enclose the internal space of the above-mentioned filter element, and diametrical protrusions formed on the outer surface of the above-mentioned cover member.

Thus, the cover member can be easily attached to and detached from the base body by holding it by its protrusions and turning it, so that the retention and release of the filter element can be effected with ease. Accordingly, this invention provides an air cleaner which is composed of a very small number of parts, which allows the mounting and maintenance operations to be performed with ease, and which exhibits a satisfactory sealing property. Further, this invention makes it possible to obtain a desirable air flow in the air cleaner.

DESCRIPTION OF THE PREFERRED EMBODIMENT

Figure 1:
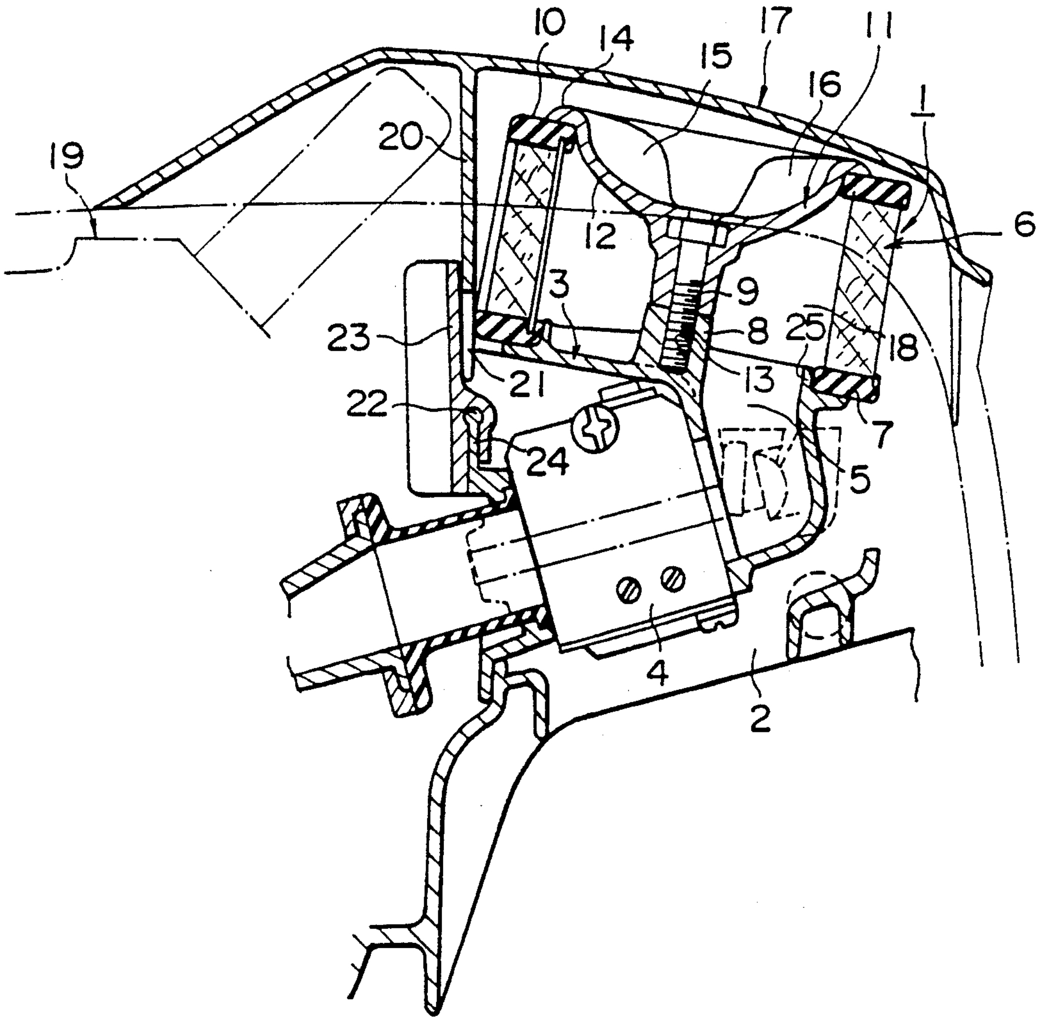
FIG. 1 is a sectional view showing the essential part of a chain saw into which an air cleaner in accordance with this invention is incorporated.
Figure 2:
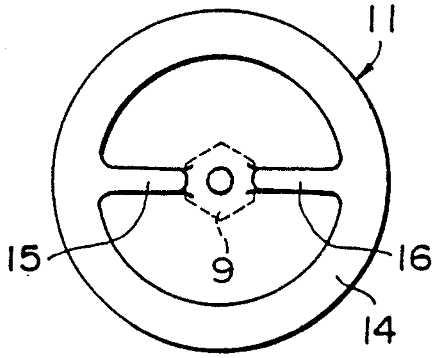
FIG. 2 is a plan view of the cover member of the air cleaner shown in FIG. 1.

An embodiment of this invention will now be described with reference to the accompanying drawings.

The embodiment is shown as applied to the air cleaner of a chain saw. This air cleaner 1 has a base body 3, which has a disc-like configuration when seen from above and which is fixed in an appropirate manner to the chain saw body in the upper section of the carburetor chamber 2. The rear half section of this base body 3 is formed as an outlet passage 5 for guiding the cleaned air to a diaphragm-type carburetor 4. The upper section of the base body 3 supports a cylindrical filter element 6, whose annular lower end section 7, which is endowed with a sealing property, is engaged with an annular carrier section 25 of the base body 3. The base body 3 has at its center an integrally formed boss section 8, which protrudes upwards and which includes a tapped hole 13 situated at its center.

The cylindrical filter element 6 further includes an annular upper end section 10, which is also endowed with a sealing property and which is closed by a cover member 11. This cover member 11 is made of an appropriate synthetic resin and its central portion is semispherically concave to form a round-cup-like configuration. A downwardly protruding bolt 9 is integrally inserted in the central portion of the lower side 12 of this cover member 11. This bolt 9 is adapted to engage with the tapped hole 13 of the boss section 8 mentioned above. Further, the peripheral edge of the cover member 11 is formed as an annular protruding section 14, which protrudes radially outwards. This annular protruding section 14 abuts against the upper end section 10 of the cylindrical filter element 6. The cover member 11 is further equipped with a pair of integrally formed thin protrusions 15 and 16, which extend radially inwards. These protrusions 15 and 16 serve as a handle.

When mounting the air cleaner 1 of this invention, the operator places the lower end section 7 of the filter element 6 on the base body 3, and screws the bolt 9 of the cover member 11 into the tapped hole 13 of the base body 3 by turning the protrusions 15, 16 of the cover member 11 by hand. Then, the annular protruding section 14 of the cover member 11 abuts against the upper end section 10 of the filter element 6, thus holding the filter element 6 against the base body 3. The air cleaner 1 can be disassembled with ease by turning the protrusions 15, 16 in the reverse direction by hand.

While the chain saw is operating, the air which has entered the cover 17 of the carburetor chamber 2 is passed through the outer peripheral surface of the filter element 6 and flows through this filter element 6 to enter the internal space 18 of the air cleaner 1. In this process, any foreign matter in the air, such as dust, is left on the outer peripheral surface of the filter element 6 and is removed in this way. It is the air which has been thus cleaned that is allowed to enter the internal space 18. Once inside the internal space 18, the air is sucked into the carburetor 4 through the outlet passage 5 of the base body 3. The lower side 12 of the cover member 11, which faces the internal space 18, is formed as a curved surface which helps to guide the air flow in the internal space 18 in a desirable manner, thereby improving the air permeability characteristic of the air cleaner 1.

Further, in the chain saw of this embodiment, an opening 21 is formed in the partition wall 20, which is integrally formed on the lower surface of the detachable cover 17 for covering the carburetor chamber 2 and which serves to insulate the air cleaner 1 from the internal combustion engine 19. Provided below this opening 21 is a barrier 22 which protrudes upwards and which has a thick top end portion. The opening 21 of the partition wall 20 is normally closed by an elastic closing member 23, which has in its lower section a groove 24 that is adapted to be slidably engaged with the above-mentioned barrier 22, thereby allowing the closing member 23 to open and close the opening 21. In summer, the closing member 23 prevents the air which has been warmed as a result of flowing around the internal combustion engine 19 and absorbing heat therefrom from entering the carburetor chamber 2 through the opening 21 but through another opening (not shown) of the carburetor chamber 2. When, however, the outside air temperature is low, as in winter, the closing member 23 is moved along the barrier 22 so as to allow the air which has been warmed as a result of flowing around the internal combustion engine 19 to enter the carburetor chamber 2 through the opening 21, thereby supplying the carburetor 4 with warm air. In this way, the engine can be maintained in satisfactory operating condition.

I claim:

1. An air cleaner comprising: a base body which includes a boss section and an outlet passage, a cylindrical filter element having an upper end section and a lower and section which is situated on said base body, a cover member which includes a bolt protruding from the center of its lower surface and which is adapted to be engaged with a tapped hole formed in the boss section of said base body and which is adapted to be engaged with the upper end section of said filter element so as to enclose the internal space of said filter element, and said cover member has a downwardly concave central outer surface portion, said outer surface portion having a pair of integrally formed thin diametrical protrusions which extend radially inwards from the periphery and which serve as a handle.

2. An air cleaner as claimed in claim 1, wherein said cover member is made of synthetic resin and has a downwardly concave central outer surface portion, said outer surface portion having a pair of integrally formed thin diametrical protrusions which extend radially inwards from the periphery and which serve as a handle.

* * * * *